United States Patent

[11] 3,615,747

[72] Inventor Harry Friedman
 41-16 Union St., Fairlawn, N.J. 07410
[21] Appl. No. 740,444
[22] Filed June 21, 1968
[45] Patented Oct. 26, 1971
 Continuation-in-part of application Ser. No. 447,064, Apr. 9, 1965, now abandoned.

[54] COLD GUN BLUE IN SOLID OR SEMISOLID STATE
 7 Claims, No Drawings

[52] U.S. Cl. .................................... 106/19,
 42/76.1, 106/34, 106/286, 106/287, 106/308, 117/135.1, 117/169, 148/6, 148/6.14
[51] Int. Cl. ...................................... C09d 11/00, C09d 13/00

[50] Field of Search.......................... 106/287 A, 286, 19-32, 1, 34, 308; 148/6, 6.14; 117/127, 135.1, 169; 42/76.1

[56] References Cited
UNITED STATES PATENTS

| | | | |
|---|---|---|---|
| 2,102,925 | 12/1937 | Sprankle et al. ............. | 148/6.14 |
| 2,450,327 | 9/1948 | Cogan et al. ................ | 106/287 A |
| 2,856,302 | 10/1958 | Reuter........................ | 106/287 A |
| 2,864,726 | 12/1958 | Mantcuffel et al............ | 148/6.14 |
| 2,978,298 | 4/1961 | Wetzel et al. ................ | 23/182 |

Primary Examiner—Julius Frome
Assistant Examiner—Joan B. Evans
Attorney—Sparrow & Sparrow ABSTRACT: A gun blue composition in the form of a gel suitable for use at room temperatures, and a method of blueing using the composition of the invention.

COLD GUN BLUE IN SOLID OR SEMISOLID STATE

This is a continuation of application of my copending application Ser. No. 132,588 filed Aug. 21, 1961 and Ser. No. 447,064, filed Apr. 9, 1965 both now abandoned.

This invention relates generally to a gun blue composition and comprises a new product in the form of a gel adapted to be used at ambient temperatures.

Heretofore, conventional practice for blueing the surface of gun barrels and other metal objects has been the use of liquid blueing composition. Ordinarily, the use of blueing compositions necessitates high temperatures. For example, a common blueing process requires coating the piece to be treated with the liquid composition, drying, and subsequently steaming the piece until the parts are covered with rust. The piece is then boiled for about 15 minutes in water, dried, and then scratch-brushed. This entire operation is repeated several times until satisfactory blueing has been obtained.

The composition of this invention overcomes the messy application procedure attending the use of conventional gun blues and provides an even, uniform blueing of the surface to be blued. The present composition eliminates the necessity of heating the blueing composition.

The composition of this invention is economical and requires less material to cover a given surface area than is required by liquid gun blue. It avoids the considerable waste which accompanies the use of liquid material, and, because of its gel form, the gun blue according to the invention does not become contaminated as readily as a liquid material.

The gun blue product according to the invention is obtained by mixing a suitable gelling agent with any conventional adaptable liquid formula. It is, therefore, an object of the present invention to provide a gun blue in the form of an acidic hydrogel which may be applied at room temperature to the surface of a gun or other metal object to be blued.

Another object of the invention is to provide an improved, simple, practical and inexpensive method of applying gun blue at room temperatures to a gun or other metallic part to be blued.

A further object of the present invention is to provide a gun blue in gel form which, when applied, produces an even and uniform blueing of the surface, and which, because of requiring less material to cover a given surface area than otherwise is required with the liquid blue, is more economical.

A further object of the present invention is to provide a gun blue in gel form which overcomes the disadvantages of conventional liquid blue products, which is easy to apply and spread, and which imparts to the gun surface a uniform blueing.

Yet another object of the present invention is to intimately associate a gelling agent with a suitable liquid gun blue formula.

A still further object of the present invention is to provide a new composition of matter comprising a mixture of a typical liquid gun blue containing an acid, a metal salt, and a gelling agent capable of forming the liquid gun blue into a gel in the presence of the acid.

These and other objects of the invention will appear as the description proceeds. It is to be understood, however, that the invention is not intended to be limited to the exact details described herein which illustrate certain satisfactory examples, many others of which may be obtained as a result of the knowledge gained through or gleaned from an understanding of the invention; and it is further intended that there be included as part of the invention all such obvious changes and modifications thereof as would occur to a person skilled in the art to which this invention pertains and falls within the scope of the claims appended hereto.

A main feature of the invention is to associate a gelling agent with a suitable conventional or adaptable liquid gun blue formula to produce a gelled gun blue product or composition of matter useful at room temperature.

The term "gel" as used herein means a solid, rigid and coherent system having a measurable yield point and being composed of dispersing medium and dispersed part, the latter having particles of colloidal dimension and the substance being a system that will flow only upon the influence of a finite force necessary to overcome the forces holding the particles in place. The gels of this invention may advantageously be thixotropic whereby they will have all the advantages of a gel as set forth above, and, in addition, will spread easily and uniformly upon application to the object to be treated.

The gelling agent may comprise any suitable conventional gelling agent capable of forming hydrogels under the acidic conditions required by gun blue formulations. Suitable gelling agents may be, for example, the colloidal silicas and silica aerogels typical of which are products sold under the name "CAB-O-SIL" and "SYLOID 244." "CAB-O-SIL" is a submicroscopic particulate silica prepared by vapor phase hydrolysis, and comprising silicon dioxide having a particle size in the range of from 0.015 to 0.020 micron. Another suitable gelling agent is "GAFAC RM-710" which comprises a mixture of mono- and diesters of orthophosphoric acid made from nonionic surfactants of the ethylene oxide type. "GAFAC RM-710" has a density of 1.06 to 1.08, an acid number of 35–45, and a pH of 1.5 to 2.5. Also suitable is an interpolymer of methyl vinyl ether and maleic anhydride, typical of which is a product sold as "GANTREZ AN-169" in combination with polyvinyl alcohol system or fully hydrolized polyvinyl alcohol; and a water-soluble resin, typical of which is a product sold under the name "POLYOX". Other suitable agents for gelling the acidic gun blue compositions include substituted cellulosic products of which "METHOCEL" is a typical example. The gelling agent must be capable of use in a strong acidic composition, i.e., a composition having a very low pH as set forth hereinafter, and accordingly, such known gelling agents as pectin and gelatin are not suitable for use in my invention.

Acids which are useful in the practice of this invention include as preferred embodiments, but are not limited to hydrochloric acid and nitric acid. Similarly, salts that may advantageously be used in this invention will be comprised of an anion such as chloride, sulfate and nitrate ions. Useful cations include the ferric and ammonium ions as well as salts of copper, mercury, zinc, antimony, bismuth, and the like.

The following are typical examples of liquid gun blue formulas useful according to the invention:

Example I

| | |
|---|---|
| Mercuric chloride | 4 grams |
| Bismuth oxychloride | 2 grams |
| Hydrochloric acid 1:16 | 12 grams |
| Water sufficient to make 100 cubic centimeters of content | |

Example II

| | |
|---|---|
| ferric chloride | 2 oz. |
| mercuric nitrate | 2 oz. |
| hydrochloric acid | 2 oz. |
| alcohol | 8 oz. |
| water | 8 oz. |

Example III

| | |
|---|---|
| nitric acid | 5% |
| copper nitrate | 5% |
| selenious acid | 10% |
| water | 80% |

To form the aqueous gun blue formula into a gel, the liquid gun blue is placed in a suitable mixing tank and agitated with a high degree of turbulence. The gelling agent is then slowly added to the turbulently mixed solution over a period of about 15 to 20 minutes. The mixture is then further agitated for about 2 to 4 hours and subsequently allowed to stand whereupon the composition will form a gel after approximately 12 hours. The product gels of this invention will have a pH of less than 2, and preferably between about 0.5 and 1.

In order to produce a satisfactory, uniform and desirable acidic hydrogel gun blue composition according to the invention, a colloidal silica, silica aerogel, or other gelling agent is used in amounts of about 5 to 25 percent and preferably about 10 to 12 percent by weight based on the weight of the entire composition. Thus, it will be seen that the ratio of aqueous gun blue composition to gelling agent in the acidic hydrogel product will vary from about 19:1 to 3:1.

While the above examples describe presently preferred cold gun blues in which the various components are present in specific amounts, it will be understood that the amounts of these compounds may be varied. For example, useful compositions similar to that described in example III include compositions in which the nitric acid is varied from 2 to 10 percent, copper nitrate from 3 to 10 percent, selenious acid from 5 to 15 percent, and water from 65 to 90 percent.

In general the liquid gun blue composition will contain from 2 to 25 percent by weight of acid, and 3 to 25 percent salt of the type hereinabove described. The balance may be substantially all water or may contain minor proportions of other adjuvants as for example alcohol.

Prior to application to a metallic surface of the acidic hydrogel gun blue made according to the invention, all oil or grease is removed from the surface to be blued by wiping with carbon tetrachloride, gasoline or other degreasing solvent. Pitted or rusted surfaces should be sanded, preferably with light emery paper. A small amount of the gel is then applied with a clean patch. When the patch blackens, a new patch should be used. The blued surface is then flushed with water and dried by light rubbing with a soft cloth. In order to avoid uneven coloration, the blueing gel should not be allowed to remain in contact with the metal for extended periods without rubbing. It has been found that improved penetration of the blueing substance can be obtained by repeating the application and rubbing steps.

The following example describes a preferred embodiment of the invention:

Example IV

Eighty-nine parts by weight of the gun blue formula described in example III are placed in a mixing tank having rotary mixing means therein, and is there subjected to vigorous agitation causing a high degree of turbulence. While the agitation continues, 11 parts by weight of a submicroscopic particulate silica, sold under the trade name "CAB-O-SIL", is slowly added during a period of 18 minutes. The agitation is continued for 3 hours and the resulting composition allowed to stand overnight thereby forming an acid hydrogel.

A gun barrel having some rust spots thereon is lightly sanded with emery paper in the area of the rust spots. This treatment is followed by a careful wiping of the entire surface of the gun barrel with gasoline.

A clean cloth patch is used to apply a small amount of hydrogel, formed in accordance with the procedure set forth above, to the gun barrel. This gel is applied at room temperature a small amount at a time with substantially continuous rubbing which breaks the gel evenly coating the gun barrel. Clean patches are used as necessary.

After completing the application and rubbing steps over the portion to be blued, the gun barrel is flushed with water and dried by lightly rubbing (i.e. buffing) with a clean, soft cloth. The entire process is then repeated. The treated gun barrel possesses a uniform color of superior quality.

It is understood that although certain specific examples and applications have been heretofore mentioned, the invention is not limited thereto, but embraces other examples limited only by the scope of the appended claims, as well as other applications where the preparation may be used or become useful.

I claim:

1. A method of blueing a metallic surface comprising degreasing said metallic surface, wiping an acidic hydrogel composition having a pH of less than about 2 onto said surface at room temperature, said acidic hydrogel composition containing an aqueous base liquid gun blue composition, rubbing said surface and said hydrogel composition to break said hydrogel and evenly coat said surface with said composition, removing said composition from said surface, and buffing said surface.

2. The method of claim 1 wherein said acidic hydrogel composition consists essentially of about 75 to 95 percent by weight of an aqueous base liquid gun blue composition in combination with about 5 to 25 percent by weight of a gelling agent capable of forming a gel under highly acidic conditions.

3. The method of claim 2 wherein said gelling agent is a colloidal silica and said aqueous base liquid gun blue composition comprises an acid selected from the group consisting of hydrochloric acid and nitric acid and at least one salt having an anion selected from the group consisting of chloride, sulfate, and nitrate and a cation selected from the group consisting of ferric, ammonium, cupric, mercuric, zinc, antimony, and bismuth.

4. In a composition adapted to be applied to metallic surfaces at room temperatures to form a blued surface thereon, the improvement comprising a gun blue composition in the form of an acidic hydrogel wherein said hydrogel has a pH of less than about 2 and consists essentially of about 75 to 95 percent by weight of an aqueous base liquid gun blue composition in combination with about 5 to 25 percent by weight of a gelling agent selected from the group consisting of colloidal silicas and silica aerogels.

5. The composition of claim 4 wherein said gelling agent is colloidal silica and said aqueous base liquid gun blue composition comprises an acid selected from the group consisting of hydrochloric acid and nitric acid and at least one salt having an anion selected from the group consisting of chloride, sulfate, and nitrate and a cation selected from the group consisting of ferric, ammonium, cupric, mercuric, zinc, antimony, and bismuth.

6. The composition of claim 5 wherein said acidic gun blue composition comprises from about 2–10 percent nitric acid, 3–10 percent copper nitrate, 5–10 percent selenious acid, and 65–90 percent water.

7. The composition of claim 5 wherein said colloidal silica has a particle size in the range of 0.015 to 0.020 micron.